United States Patent
Moeller et al.

(10) Patent No.: US 12,099,335 B2
(45) Date of Patent: Sep. 24, 2024

(54) OFFLINE MODE PROXY

(71) Applicant: Schlumberger Technology Corporation, Sugar Land, TX (US)

(72) Inventors: Jens Moeller, Sugar Land, TX (US); Yuri Vanzine, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/697,812

(22) PCT Filed: Oct. 26, 2022

(86) PCT No.: PCT/US2022/047788
§ 371 (c)(1),
(2) Date: Apr. 2, 2024

(87) PCT Pub. No.: WO2023/076317
PCT Pub. Date: May 4, 2023

(65) Prior Publication Data
US 2024/0264572 A1    Aug. 8, 2024

Related U.S. Application Data

(60) Provisional application No. 63/271,869, filed on Oct. 26, 2021.

(51) Int. Cl.
G05B 15/02 (2006.01)
H04L 67/562 (2022.01)

(52) U.S. Cl.
CPC ............ *G05B 15/02* (2013.01); *H04L 67/562* (2022.05)

(58) Field of Classification Search
None
See application file for complete search history.

(56) References Cited

U.S. PATENT DOCUMENTS 8,776,103 B2    7/2014  Lu
9,298,715 B2 *  3/2016  Kumarasamy ...... G06F 9/45558
(Continued)

FOREIGN PATENT DOCUMENTS

CN      112165431 A     1/2021
WO      2021091594 A1   5/2021

OTHER PUBLICATIONS

Search Report and Written Opinion of International Patent Application No. PCT/US2022/047788; Dated Feb. 10, 2023; 7 pages.
(Continued)

*Primary Examiner* — Ranodhi Serrao
(74) *Attorney, Agent, or Firm* — Jeffrey D. Frantz (57) ABSTRACT

A system includes a first computing system. The first computing system includes a target and an offline mode proxy. The offline mode proxy is configured to perform operations. The operations include monitoring an online request from the target to a service. The operations also include monitoring an online response from the service to the target. The operations also include monitoring an offline request from the target to the service. The operations also include generating and transmitting a proxy response to the target in response to the offline request. The proxy response is based at least partially upon the online request, the online response, the offline request, or a combination thereof.

15 Claims, 5 Drawing Sheets

(56) References Cited

U.S. PATENT DOCUMENTS

| | | |
|---|---|---|
| 2006/0285436 A1 | 12/2006 | Mayorga Lopez |
| 2012/0290645 A1* | 11/2012 | Arvidsson ............... G06F 9/541 |
| | | 709/203 |
| 2013/0238562 A1* | 9/2013 | Kumarasamy ...... G06F 11/1451 |
| | | 707/649 |
| 2016/0094497 A1* | 3/2016 | Javed ...................... H04L 67/08 |
| | | 709/206 |
| 2023/0101628 A1* | 3/2023 | Wise ......................... G06F 8/63 |
| | | 717/175 |
| 2023/0193742 A1* | 6/2023 | Mammadov ............ E21B 21/08 |
| | | 166/250.15 |

OTHER PUBLICATIONS

Wikipedia; Squid (software) <https://en.wikipedia.org/wiki/Squid_(software)> retrieved from the world wide web on Jul. 2, 2024; 5 pages.

Wikipedia; Pi-hole <https://en.wikipedia.org/wiki/Pi-hole> retrieved from the world wide web on Jul. 2, 2024; 3 pages.

International Preliminary Report on Patentability of International Patent Application No. PCT/US2022/047788; Dated May 10, 2024; 5 pgs.

* cited by examiner

OFFLINE MODE PROXY

CROSS-REFERENCE TO RELATED APPLICATIONS

This application is the National Stage Entry of International Application No. PCT/US2022/047788, filed Oct. 26, 2022, which claims priority to U.S. Provisional Patent Application No. 63/271,869, filed on Oct. 26, 2021, the entirety of which is incorporated by reference herein.

BACKGROUND

A target may communicate with one or more services (e.g., applications) when the target and the services are online. For example, the target may transmit a request to a service, and the service may then transmit a response back to the target. However, sometimes the target, the service, or both may be offline, meaning that the target and the service may no longer communicate with one another. This may present a problem when the target requests information from the service or vice versa.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system is disclosed. The system includes a first computing system. The first computing system includes a target and an offline mode proxy. The offline mode proxy is configured to perform operations. The operations include monitoring an online request from the target to a service. The operations also include monitoring an online response from the service to the target. The operations also include monitoring an offline request from the target to the service. The operations also include generating and transmitting a proxy response to the target in response to the offline request. The proxy response is based at least partially upon the online request, the online response, the offline request, or a combination thereof.

A computing system is also disclosed. The computing system includes one or more processors and a memory system. The memory system includes one or more non-transitory computer-readable media storing instructions that, when executed by at least one of the one or more processors, cause the computing system to perform operations. The operations include monitoring a first online request from a target to a service with an offline mode proxy. The first online request includes a first set of data and instructions to store the first set of data. The operations also include monitoring a first online response from the service to the target with the offline mode proxy. The first online response includes confirmation that the first set of data is stored. The operations also include monitoring a first drilling operation request from the target to a downhole tool with the offline mode proxy. The operations also include first drilling operation request comprises instructions to modify a drilling operation in a wellbore. The instructions are based at least partially upon the first online request, the first online response, or both. The operations also include monitoring a first offline request from the target to the service with the offline mode proxy. The first offline request includes the first set of data. The operations also include generating a first proxy response from the offline mode proxy to the target. The first proxy response is based at least partially upon the first online request, the first online response, the first offline request, or a combination thereof. The operations also include generating and transmitting a second drilling operation request from the target to the downhole tool. The second drilling operation request includes instructions to modify the drilling operation in the wellbore, and wherein the instructions are based at least partially upon the first offline request, the first proxy response, or both.

A non-transitory computer-readable medium is also disclosed. The medium stores instructions that, when executed by at least one processor of a computing system, cause the computing system to perform operations. The operations include monitoring a first online request from a target to a first service with an offline mode proxy. The first online request includes a first set of data and instructions to store the first set of data. The first set of data is acquired by a sensor on a downhole tool in a wellbore. The operations also include monitoring a first online response from the first service to the target with the offline mode proxy. The first online response includes confirmation that the first set of data is stored and an identifier assigned to the first set of data. The operations also include monitoring a second online request from the target to a second service with the offline mode proxy. The second online request includes instructions for the second service to transmit a second set of data to the target. The second set of data includes previously-acquired properties from one or more offset wellbores. The operations also include monitoring a second online response from the second service to the target with the offline mode proxy. The second online response includes the second set of data. The operations also include monitoring a third online request from the target to a third service with the offline mode proxy. The third online request includes instructions for the third service to transmit a third set of data to the target. The third set of data includes conditions for the wellbore in which the downhole tool is located. The operations also include monitoring a third online response from the third service to the target with the offline mode proxy. The third online response includes the third set of data. The operations also include monitoring a first drilling operation request from the target to the downhole tool. The first drilling operation request includes instructions to modify a drilling operation in the wellbore. The instructions are based at least partially upon the first online request, the first online response, the second online request, the second online response, the third online request, the third online response, or a combination thereof. The operations also include monitoring a first drilling operation response from the downhole tool to the target with the offline mode proxy. The first drilling operation response indicates that the drilling operation has been completed. The operations also include monitoring a first offline request from the target to the first service with the offline mode proxy. The first offline request includes the first set of data and instructions to store the first set of data. The operations also include generating a first proxy response from the offline mode proxy to the target. The first proxy response is based at least partially upon the first online response. The operations also include monitoring a second offline request from the target to the second service with the offline mode proxy. The second offline request includes instructions for the second service to transmit the second set of data to the target. The operations also include generating a second proxy response from the offline mode proxy to the target. The second proxy response is based at least partially upon the second online response. The operations also include monitoring a third offline request from the target to the third service with the offline mode proxy. The third offline request includes instructions for the third service to transmit the third set of data to the target. The operations also include generating a third proxy response from the offline mode proxy to the target. The third proxy response is based at least partially upon the third online response. The operations also include generating and transmitting a second drilling operation request from the target to the downhole tool. The second drilling operation request includes instructions to modify the drilling operation in the wellbore. The instructions are based at least partially upon the first proxy response, the second proxy response, the third proxy response, or a combination thereof.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
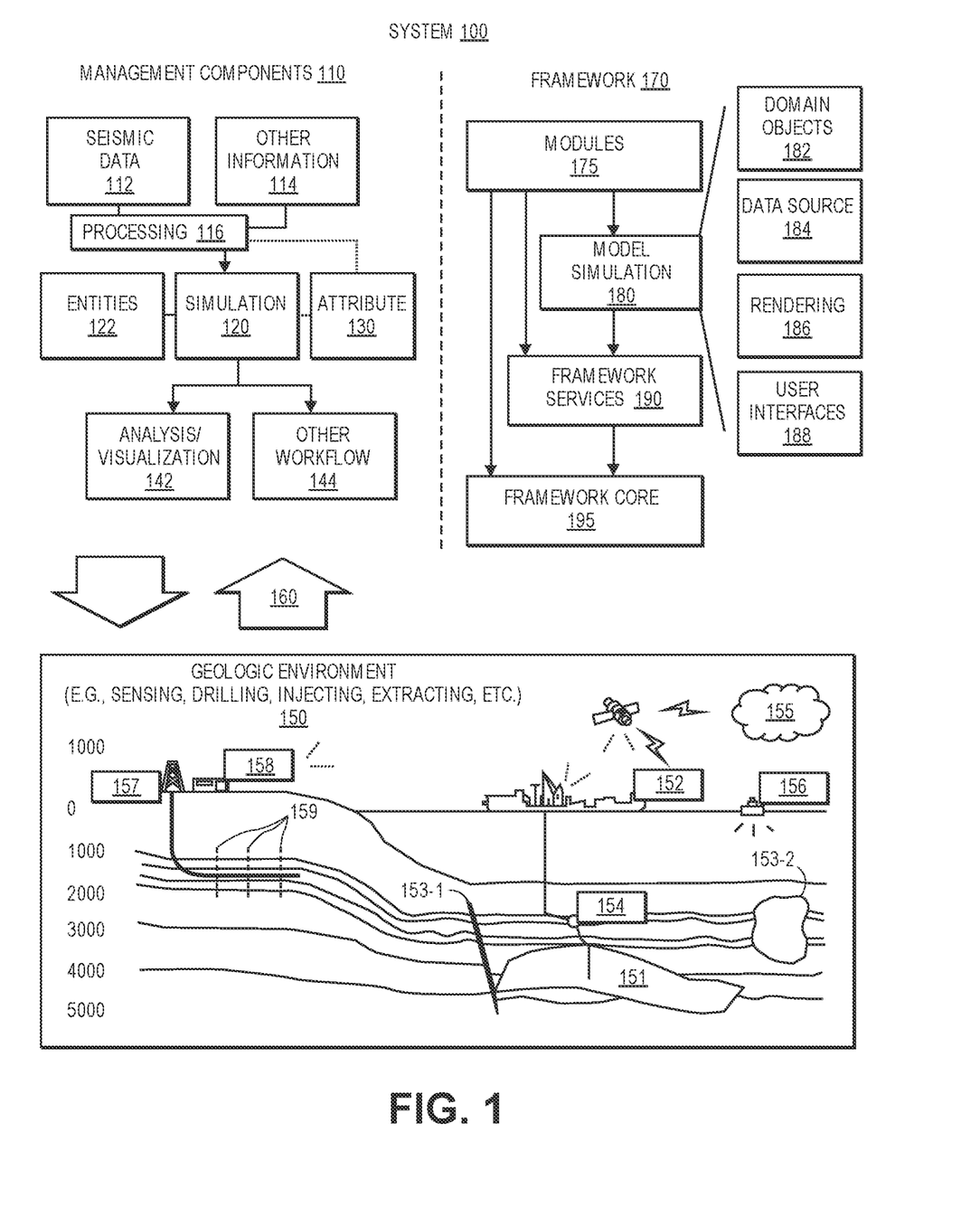
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results, and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures), or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Offline Mode Proxy

Figure 2:
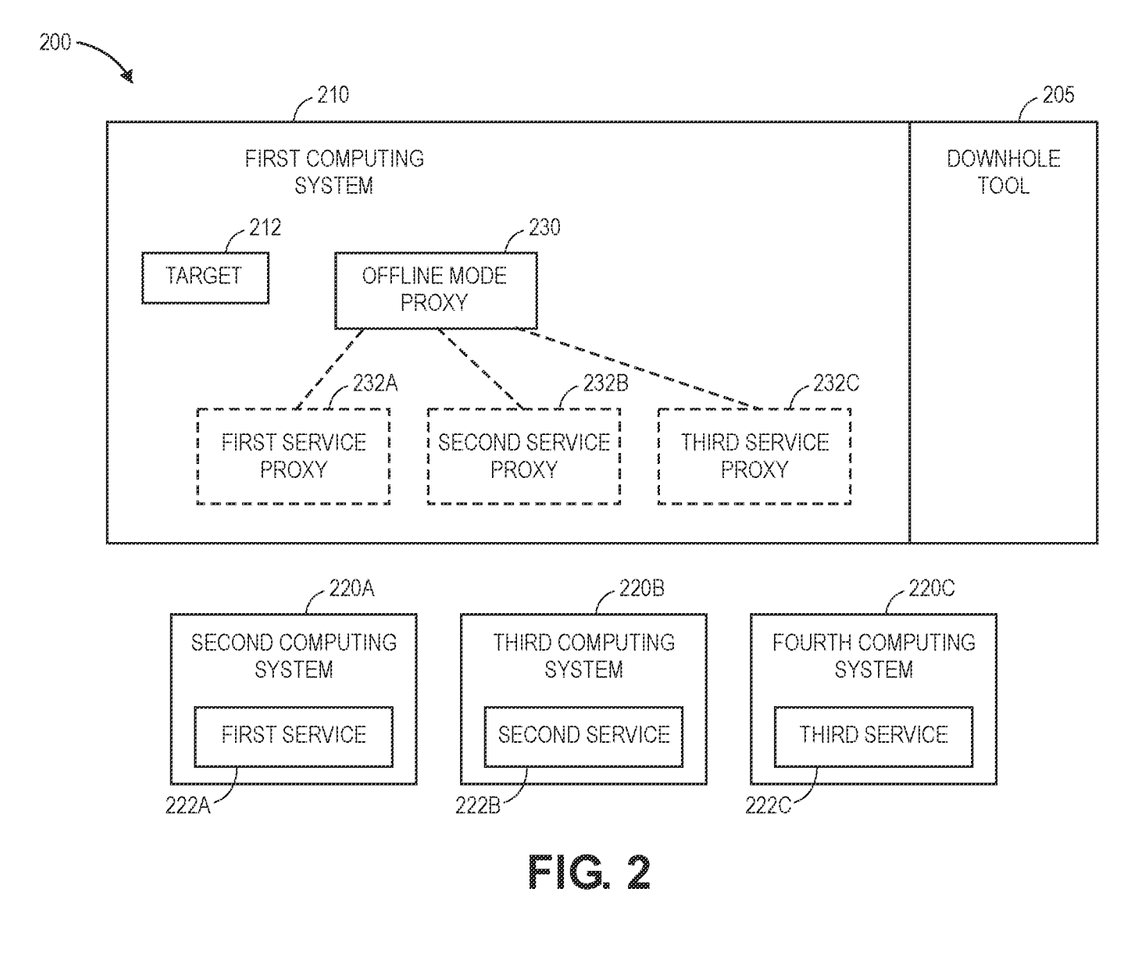
FIG. 2 illustrates a schematic view of a system for performing an offline proxy application interaction, according to an embodiment.

FIG. 2 illustrates a schematic view of a system 200 for performing an offline proxy application interaction, according to an embodiment. The system 200 may include a first computing system 210. In one embodiment, the first computing system 210 may be part of a downhole tool 205 such as a bottom hole assembly (BHA) that may be in a wellbore in a subterranean formation. A target 212 may run on the first computing system 210. The target 212 may be or include an application. In one example, the target 212 may be configured to acquire sensor data (e.g., from a sensor on the downhole tool 205). The sensor data may be or include physical properties (e.g., pressure, temperature, wellbore trajectory) and/or formation properties (e.g., resistivity, porosity, sonic velocity, gamma ray).

The first computing system 210 may be configured to communicate with one or more other computing systems (three are shown: 220A, 220B, 220C) when the system 200 is online. As used herein, "online" refers to an ability of two computing systems to communicate with one another. In one embodiment, the computing systems 220A-220C may be located above the subterranean formation (e.g., not in the wellbore). Each computing system 220A-220C may include a service 222A, 222B, 222C, and the target 212 may be configured to communicate with the services 222A-222C when the system 200 is online.

The services 222A-222C may be or include storage media that are configured to store data. The first service 222A may be configured to store a first set of data, the second service 222B may be configured to store a second set of data, and the third service 222C may be configured to store a third set of data. In an example, the first set of data may be or include the sensor data from the target 212, the second set of data may be or include previously-acquired physical properties and/or formation properties (e.g., from offset wellbores), and the third set of data may be or include conditions data for the wellbore in which the downhole tool 205 is located (e.g., soil types, viscosity, etc.).

The system 200 (e.g., the first computing system 210) may also include an offline mode proxy 230. The offline mode proxy 230 may be configured to monitor (e.g., listen) and/or store the communications between the first computing system 210 and the computing systems 220A-220C when the system 200 is online. More particularly, the offline mode proxy 230 may be configured to monitor and/or store the communications between the target 212 and the services 222A-222C when the system 200 is online.

As mentioned above, the first computing system 210 may not be able to communicate with the computing systems 220A-220C when the system 200 is offline. Thus, "offline" refers to an inability of two computing systems to communicate with one another. The offline mode proxy 230 may also be configured to serve as a proxy 232A, 232B, 232C for the services 222A-222C when the system 200 is offline. More particularly, the offline mode proxy 230 may receive communications from the target 212 to the services 222A-222C. However, the services 222A-222C may not be able to receive these communications and/or respond when the system 200 is offline. The offline mode proxy 230 may then generate proxy responses to the target 212 based upon the communications that were monitored and stored. This is described in greater detail below.

Figure 3:
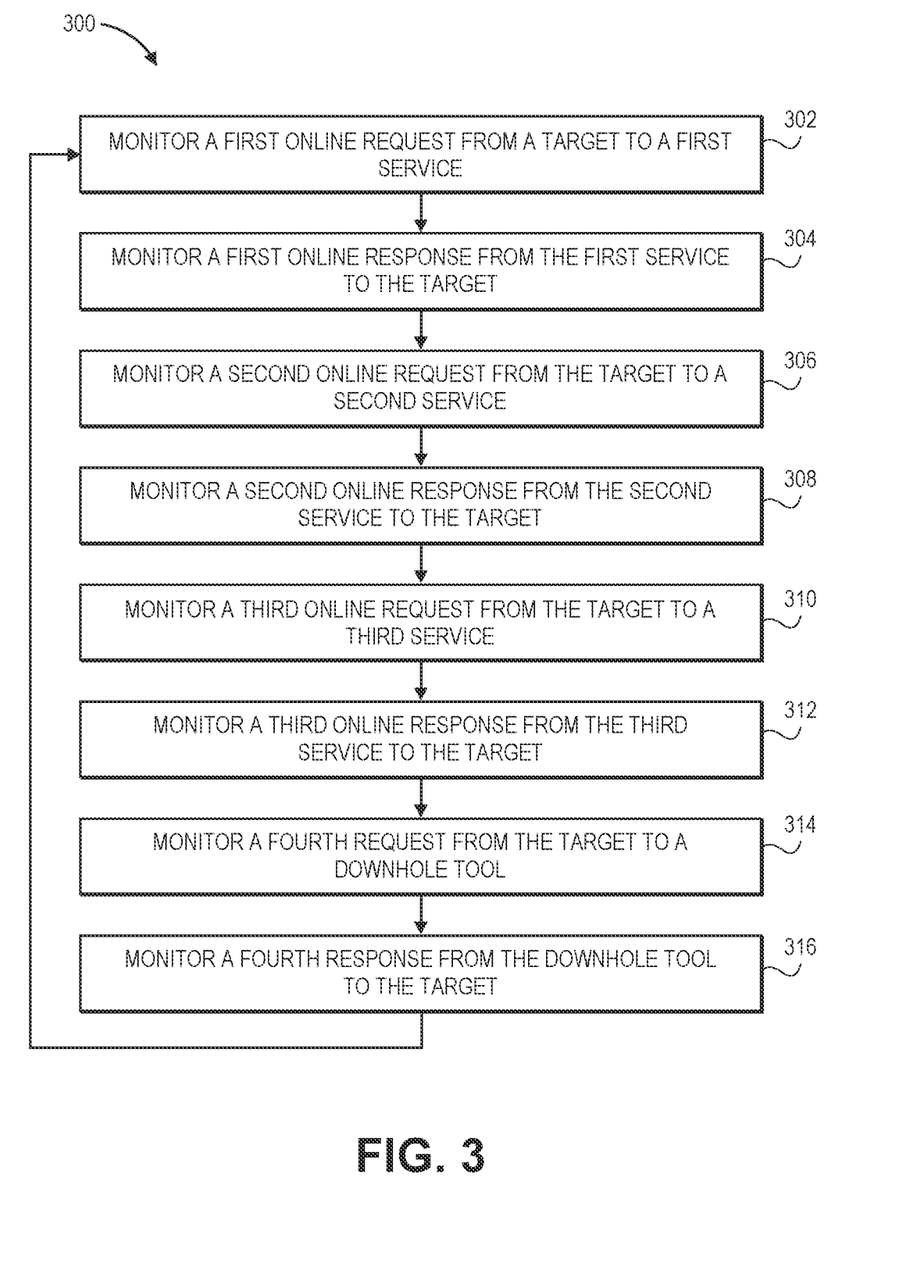
FIG. 3 illustrates a flowchart of a method for performing an offline proxy application interaction in a first (e.g., listen) mode, according to an embodiment.

FIG. 3 illustrates a flowchart of a method 300 for performing an offline proxy application interaction in a first (e.g., listen) mode, according to an embodiment. The method 300 may be performed when the system 200 is online (e.g., the computing system 210 may be able to communicate with the computing systems 220A-220C). Thus, the requests and the responses in the method 300 may be referred to as online requests and online responses. At least a portion of the method 300 may be performed by the computing system 210 (e.g., by the target 212 and/or the offline mode proxy 230). An illustrative order of the method 300 is provided below; however, one or more aspects of the method 300 may be performed in a different order, split, combined, repeated, or omitted.

The method 300 may include monitoring a first online request from the target 212 to the first service 222A, as at 302. This may include the offline mode proxy 230 storing the first request. In one example, the target 212 may acquire a first set of data (e.g., the sensor data), and the first online request may include the sensor data and instructions to store the sensor data.

The method 300 may also include monitoring a first online response from the first service 222A to the target 212, as at 304. This may include the offline mode proxy 230 storing the first response. In one example, the first service 222A may store the first set of data and/or assign an identifier to the first set of data. The first online response may indicate the identifier and confirmation that the first set of data was stored.

The method 300 may also include monitoring a second online request from the target 212 to the second service 222B, as at 306. This may include the offline mode proxy 230 storing the second request. In one example, the second online request include instructions for the second service 222B to transmit the second set of data (e.g., the previously-acquired properties from offset wellbores) to the target 212.

The method 300 may also include monitoring a second online response from the second service 222B to the target 212, as at 308. This may include the offline mode proxy 230 storing the second response. The second online response may include the second set of data.

The method 300 may also include monitoring a third online request from the target 212 to the third service 222C, as at 310. This may include the offline mode proxy 230 storing the third request. In one example, the third online request may include instructions for the third service 222C to transmit the third set of data (e.g., the conditions data) to the target 212.

The method 300 may also include monitoring a third online response from the third service 222C to the target 212, as at 312. This may include the offline mode proxy 230 storing the third response. The third online response may include the third set of data.

The method 300 may also include generating, transmitting and/or monitoring a fourth request (also referred to as a drilling operation request) from the target 212 to the downhole tool 205, as at 314. This may include the target 212 generating and/or transmitting the fourth request, and the offline mode proxy 230 storing the fourth request. In one example, the fourth request may be or include an instruction to the downhole tool 205 to modify a drilling operation in the wellbore. The instruction may be based at least partially upon the first online request and/or response (e.g., the first set of data), the second online request and/or response (e.g., the second set of data), the third online request and/or response (e.g., the third set of data), or a combination thereof. In an example, the modification to the drilling operation may be or include modifying the drilling trajectory, modifying the weight-on-bit, capturing a downhole measurement, or the like.

The method 300 may also include monitoring a fourth response (also referred to as a drilling operation response) from the downhole tool 205 to the target 212, as at 316. This may include the offline mode proxy 230 storing the fourth response. The fourth response may indicate that the modification has been completed.

The method 300 may then loop back around to 302 and repeat after the drilling operation has been modified.

Figure 4:
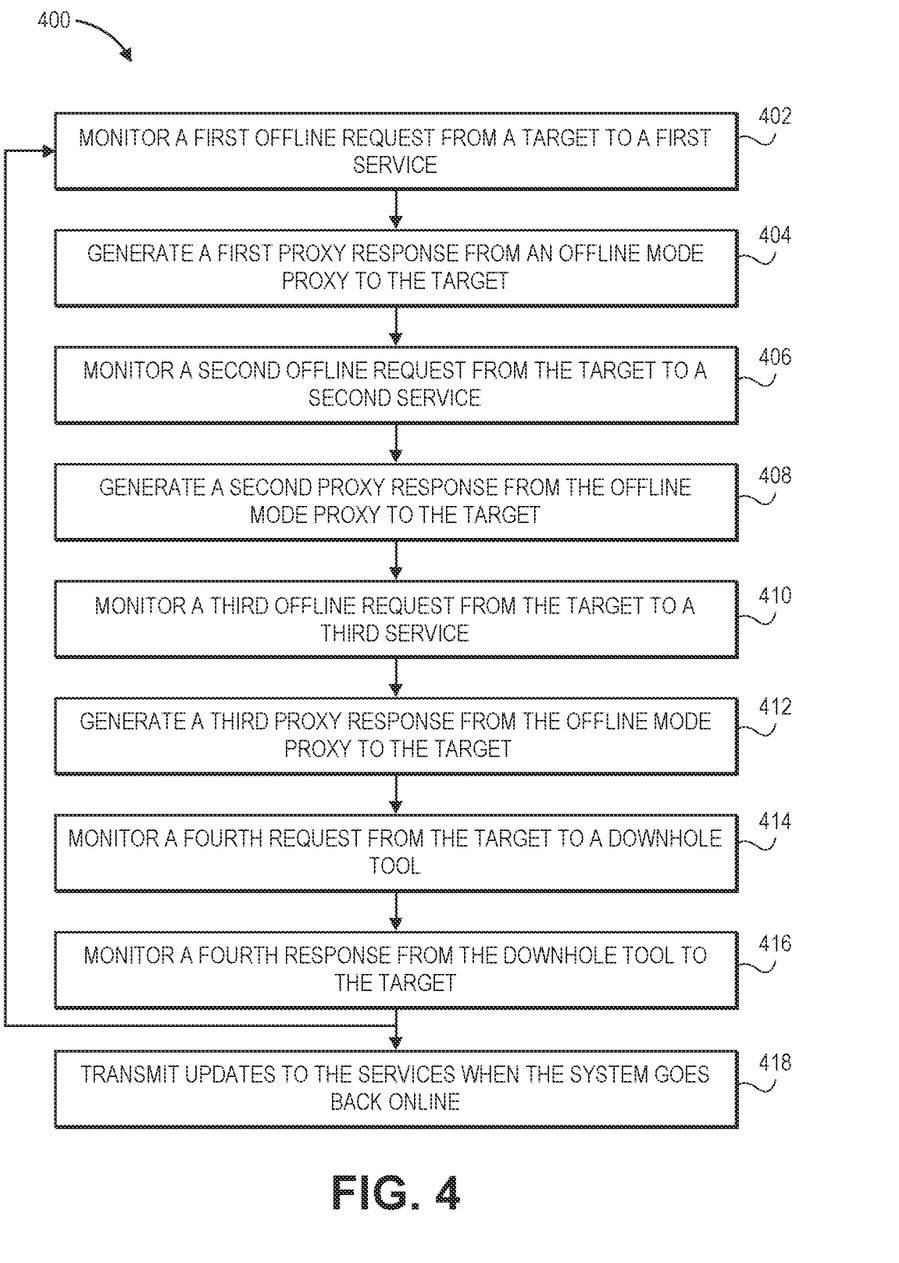
FIG. 4 illustrates a flowchart of another method for performing another offline proxy application interaction in a second (e.g., impersonate) mode, according to an embodiment.

FIG. 4 illustrates a flowchart of another method 400 for performing an offline proxy application interaction in a second (e.g., impersonate) mode, according to an embodiment. The method 400 may be performed when the system 200 is offline such that the computing system 210 is unable to communicate with the computing systems 220A-220C. Thus, the requests and the responses in the method 400 may be referred to as offline requests and offline responses (or proxy responses). The method 400 may be performed after the method 300. At least a portion of the method 400 may be performed by the first computing system 210 (e.g., by the target 212 and/or the offline mode proxy 230). An illustrative order of the method 400 is provided below; however, one or more aspects of the method 400 may be performed in a different order, split, combined, repeated, or omitted.

The method 400 may include monitoring a first offline request from the target 212 to the first service 222A, as at 402. This may include the offline mode proxy 230 storing the first offline request. In one example, the target 212 may acquire a first set of data (e.g., the sensor data), and the first offline request may include the sensor data and instructions to store the sensor data. However, the first service 222A may not receive the first offline request because the system 200 may be offline.

In one embodiment, the first set of data in the method 400 may be the same as the first set of data in the method 300. In another embodiment, the first set of data in the method 400 may be different than the first set of data in the method 300. For example, the first set of data in the method 400 may be measured/acquired subsequent to the first set of data in the method 300.

The method 400 may also include generating and/or transmitting a first proxy response to the target 212, as at 404. This may include the offline mode proxy 230 impersonating the first service 222A (e.g., as the first service proxy 232A) by generating and transmitting the first proxy response to the target 212. The first proxy response may be based at least partially upon the first online request (from 302), the sensor data (from 302), the first online response (from 304), the identifier (from 304), the sensor data (from 402), or a combination thereof.

The method 400 may also include monitoring a second offline request from the target 212 to the second service 222B, as at 406. This may include the offline mode proxy 230 storing the second offline request. In one example, the second offline request include instructions for the second service 222B to transmit the second set of data (e.g., the previously-acquired properties from offset wellbores) to the target 212.

In one embodiment, the second set of data in the method 400 may be the same as the second set of data in the method 300. In another embodiment, the second set of data in the method 400 may be different than the second set of data in the method 300. For example, the second set of data in the method 400 may be measured/acquired subsequent to the second set of data in the method 300.

The method 400 may also include generating and/or transmitting a second proxy response to the target 212, as at 408. This may include the offline mode proxy 230 impersonating the second service 222B (e.g., as the second service proxy 232B) by generating and transmitting the second proxy response to the target 212. The second proxy response may be based at least partially upon the second online request (from 306), the second set of data (from 306), the second online response (from 308), or a combination thereof.

The method 400 may also include monitoring a third offline request from the target 212 to the third service 222C, as at 410. This may include the offline mode proxy 230 storing the third offline request. In one example, the third offline request may include instructions for the third service 222C to transmit the third set of data (e.g., the conditions data) to the target 212.

In one embodiment, the third set of data in the method 400 may be the same as the third set of data in the method 300. In another embodiment, the third set of data in the method 400 may be different than the third set of data in the method 300. For example, the third set of data in the method 400 may be measured/acquired subsequent to the third set of data in the method 300.

The method 400 may also include generating and/or transmitting a third proxy response to the target 212, as at 412. This may include the offline mode proxy 230 impersonating the third service 222C (e.g., as the third service proxy 232C) by generating and transmitting the third proxy response to the target 212. The third proxy response may be based at least partially upon the third online request (from 310), the third set of data (from 310), the third online response (from 312), or a combination thereof.

The method 400 may also include generating, transmitting, and/or monitoring a fourth request (also referred to as a drilling operation request) from the target 212 to the downhole tool 205, as at 414. This may include the target 212 generating and/or transmitting the fourth request, and/or the offline mode proxy 230 storing the fourth request. In one example, the fourth request may be or include an instruction to the downhole tool 205 to modify a drilling operation in the wellbore. The modification to the drilling operation in 414 may be the same as or different from the modification to the drilling operation in 314. The instruction may be based at least partially upon the first offline request, the first proxy response, the second offline request, the second proxy response, the third offline request, the third proxy response, or a combination thereof. In an example, the modification to the drilling operation may be or include modifying the drilling trajectory, modifying the weight-on-bit, capturing a measurement, or the like.

The method 400 may also include monitoring a fourth response (also referred to as a drilling operation response) from the downhole tool 205 to the target 212, as at 416. This may include the offline mode proxy 230 storing the fourth response. The fourth response may indicate that the modification has been completed.

The method 400 may then loop back around to 402 and repeat after the drilling operation has been modified.

In one embodiment, the method 400 may also include transmitting updates to the services 222A-222C when the system 200 goes back online, as at 418. For example, this may include the first computing system 210 (e.g., the target 212 and/or the offline mode proxy 230) transmitting to the first service 222A the first offline request, the first proxy response, the fourth response, or a combination thereof.

As discussed above, the present disclosure includes a caching and predictive offline mode proxy 230 that responds instead of the receiver of the HTTP request (e.g., service 222A) when counterpart services stop responding. In the offline mode, the offline mode proxy 230 may understand requests and substitute real responses that enable the application (e.g., service 222A) to continue operations. While in the offline mode, the proxy 230 may accumulate requests and re-send them to the services 222A-222C once they go back online. Upon receipt of real responses from an appropriate service 222A-222C, the proxy 230 may then re-transmit the responses to the requesting service 222A-222C and allow them to update their state.

Data lost in (re)transmission during a blackout may be preserved until the receiver (e.g., service 222A) becomes available. HTTP messages are sent and received with the quality of being idempotent and/or constant. Responses to any requests may be predicted and impersonated by the offline mode proxy 230 until the connection to the receiver (e.g., service 222A) becomes available.

In a distributed microservice architecture, one or more services 222A-222C may be running simultaneously to complete the workflow of such an application. The offline mode proxy 230 may use one or more of the services 222A-222C to be available during a testing environment scenario. Debugging integration of such a workflow during development is otherwise more costly.

When requests become too frequent, and the service 222A-222C cannot keep up with the rate of the requests, the offline mode proxy 230 can temporarily step in and buffer requests until the service 222A-222C becomes available. When requests or responses take longer than a predetermined amount of time, and the traffic conditions worsen (e.g., requests take too long to operate), the offline mode proxy 230 can temporarily step in and buffer requests until traffic conditions improve.

If requests are of an optional nature, the traffic may include visual information that may be discarded once observed, and the offline mode proxy 230 can discard such requests and return responses immediately. The offline mode proxy 230 may act as a log recorder device where the service in question may later inspect or replay its interactions with other microservices. The offline mode proxy 230 may offer a centralized location for traffic that has passed through it.

The offline mode proxy 230 may store information that the service 222A-222C has requested. In addition, the offline mode proxy 230 may represent a useful search repository that the service 222A-222C can later retrieve and analyze. These application databases can be loaded offline and used at a later time as black box recorder devices. In the above-mentioned adverse cases, the offline mode proxy 230 may allow the service 222A-222C to continue operating uninterrupted, which may prevent expensive and untested anomalies from occurring.

Subsequent to application of the offline mode proxy 230, new software can rely on it to be tested and maintained within its context. Future deployments of software may become less costly. New deployment scenarios of software may become possible (e.g., private cloud deployments may be developed without writing new software). Deployments where partial stacks of services can be utilized may be or include restricted environments such as government, military, or zero internet environments. Rewriting software may be reduced by using offline mode proxy.

The offline mode proxy 230 may provide improvements over existing caching proxies or DNS proxies because it provides adequate responses and/or alters traffic to simulate behavior and/or not reject it outright. This allows existing software to continue operating. This may also degrade its operations less than existing caching proxies or DNS proxies allow it to do in its absence.

The output of the offline mode proxy 230 may be received and/or consumed as files or data stores. Users may integrate with the offline mode proxy 230, already equipped with data, instead of with a particular application because it is a known application layer abstraction, and integrating with it before integrating with the actual application may be less costly.

Figure 5:
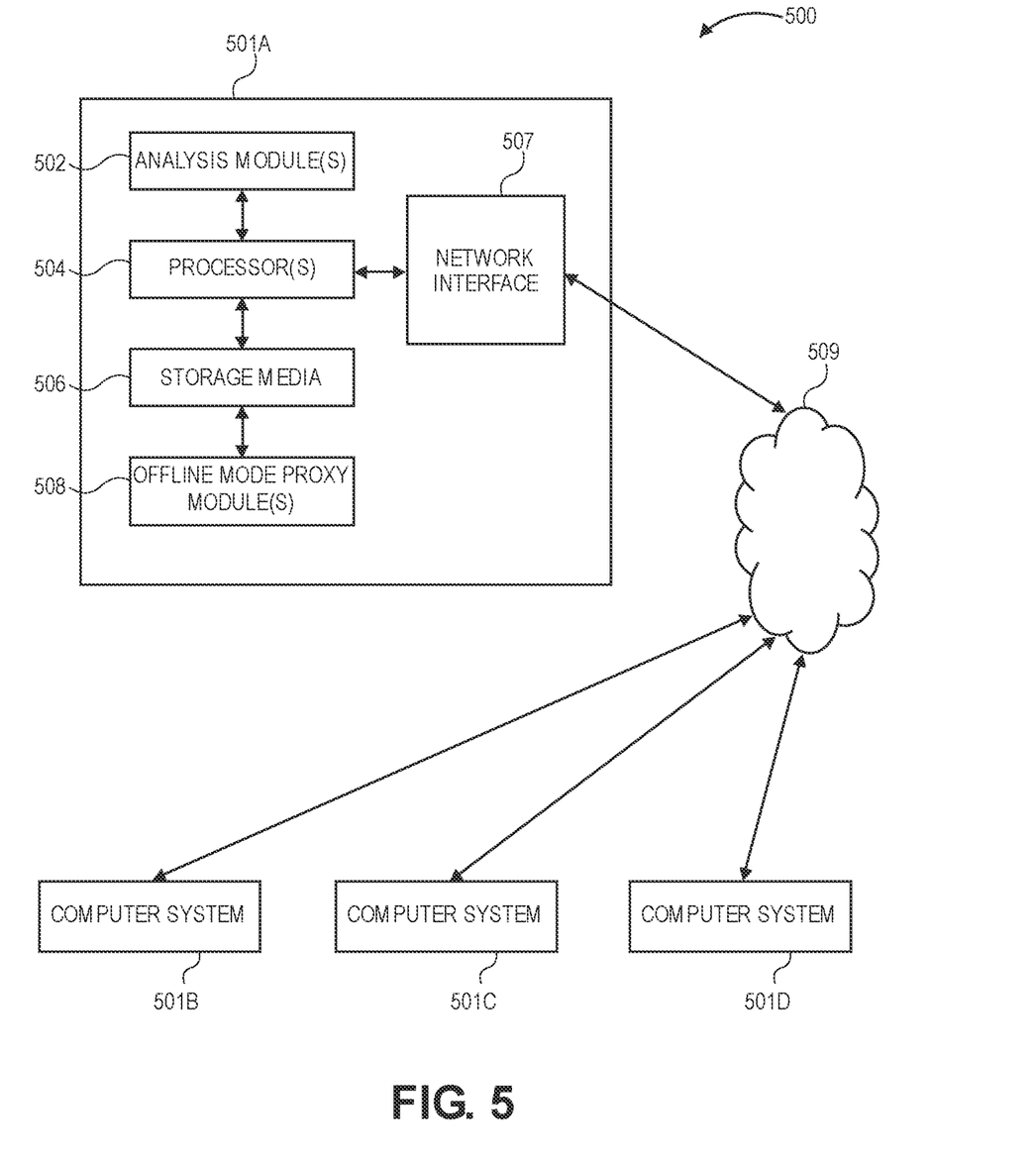
FIG. 5 illustrates an example of a computing system for performing at least a portion of one or more of the methods disclosed herein, in accordance with some embodiments.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more offline mode proxy module(s) 508. It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A system, comprising:
one or more processors; and
a first computing system comprising a target and an offline mode proxy, wherein the offline mode proxy is configured to perform operations, the operations comprising:
monitoring a first online request from the target to a first service with the offline mode proxy, wherein the first online request comprises a first set of data and instructions to store the first set of data, and wherein the first set of data is acquired by a sensor on a downhole tool in a wellbore;
monitoring a first online response from the first service to the target with the offline mode proxy, wherein the first online response comprises confirmation that the first set of data is stored and an identifier assigned to the first set of data;
monitoring a second online request from the target to a second service with the offline mode proxy, wherein the second online request comprises instructions for the second service to transmit a second set of data to the target, and wherein the second set of data comprises previously-acquired properties from one or more offset wellbores;
monitoring a second online response from the second service to the target with the offline mode proxy, wherein the second online response comprises the second set of data;
monitoring a third online request from the target to a third service with the offline mode proxy, wherein the third online request comprises instructions for the third service to transmit a third set of data to the target, and wherein the third set of data comprises conditions for the wellbore in which the downhole tool is located;
monitoring a third online response from the third service to the target with the offline mode proxy, wherein the third online response comprises the third set of data;
monitoring a first drilling operation request from the target to the downhole tool, wherein the first drilling operation request comprises instructions to modify a drilling operation in the wellbore, and wherein the instructions are based at least partially upon the first online request, the first online response, the second online request, the second online response, the third online request, the third online response, or a combination thereof;
monitoring a first drilling operation response from the downhole tool to the target with the offline mode proxy, wherein the first drilling operation response indicates that the drilling operation has been completed;
monitoring a first offline request from the target to the first service with the offline mode proxy, wherein the first offline request comprises the first set of data and instructions to store the first set of data;

generating a first proxy response from the offline mode proxy to the target, wherein the first proxy response is based at least partially upon the first online response;

monitoring a second offline request from the target to the second service with the offline mode proxy, wherein the second offline request comprises instructions for the second service to transmit the second set of data to the target;

generating a second proxy response from the offline mode proxy to the target, wherein the second proxy response is based at least partially upon the second online response;

monitoring a third offline request from the target to the third service with the offline mode proxy, wherein the third offline request comprises instructions for the third service to transmit the third set of data to the target;

generating a third proxy response from the offline mode proxy to the target, wherein the third proxy response is based at least partially upon the third online response; and generating and transmitting a second drilling operation request from the target to the downhole tool, wherein the second drilling operation request comprises instructions to modify the drilling operation in the wellbore, and wherein the instructions are based at least partially upon the first proxy response, the second proxy response, the third proxy response, or a combination thereof.

2. The system of claim 1, wherein the downhole tool comprises the target and the offline mode proxy, and wherein the first service, the second service, and the third service are located outside of the wellbore.

3. The system of claim 1, wherein the operations further comprise transmitting updates to the first, second, and third services when the target is once again able to communicate with the first, second, and third services.

4. The system of claim 3, wherein the updates are transmitted after the second drilling operation request is generated and transmitted.

5. The system of claim 4, wherein transmitting the updates comprises the target, the offline mode proxy, or both transmitting to the first service the first offline request, the first offline proxy response, or both.

6. A computing system, comprising:
one or more processors; and
a memory system including one or more non-transitory computer-readable media storing instructions that, when executed by at least one of the one or more processors, cause the computing system to perform operations, the operations comprising:
monitoring a first online request from a target to a first service with an offline mode proxy, wherein the first online request comprises a first set of data and instructions to store the first set of data, and wherein the first set of data is acquired by a sensor on a downhole tool in a wellbore;
monitoring a first online response from the first service to the target with the offline mode proxy, wherein the first online response comprises confirmation that the first set of data is stored and an identifier assigned to the first set of data;
monitoring a second online request from the target to a second service with the offline mode proxy, wherein the second online request comprises instructions for the second service to transmit a second set of data to the target, and wherein the second set of data comprises previously-acquired properties from one or more offset wellbores;

monitoring a second online response from the second service to the target with the offline mode proxy, wherein the second online response comprises the second set of data;

monitoring a third online request from the target to a third service with the offline mode proxy, wherein the third online request comprises instructions for the third service to transmit a third set of data to the target, and wherein the third set of data comprises conditions for the wellbore in which the downhole tool is located;

monitoring a third online response from the third service to the target with the offline mode proxy, wherein the third online response comprises the third set of data;

monitoring a first drilling operation request from the target to the downhole tool, wherein the first drilling operation request comprises instructions to modify a drilling operation in the wellbore, and wherein the instructions are based at least partially upon the first online request, the first online response, the second online request, the second online response, the third online request, the third online response, or a combination thereof;

monitoring a first drilling operation response from the downhole tool to the target with the offline mode proxy, wherein the first drilling operation response indicates that the drilling operation has been completed;

monitoring a first offline request from the target to the first service with the offline mode proxy, wherein the first offline request comprises the first set of data and instructions to store the first set of data;

generating a first proxy response from the offline mode proxy to the target, wherein the first proxy response is based at least partially upon the first online response;

monitoring a second offline request from the target to the second service with the offline mode proxy, wherein the second offline request comprises instructions for the second service to transmit the second set of data to the target;

generating a second proxy response from the offline mode proxy to the target, wherein the second proxy response is based at least partially upon the second online response;

monitoring a third offline request from the target to the third service with the offline mode proxy, wherein the third offline request comprises instructions for the third service to transmit the third set of data to the target;

generating a third proxy response from the offline mode proxy to the target, wherein the third proxy response is based at least partially upon the third online response; and generating and transmitting a second drilling operation request from the target to the downhole tool, wherein the second drilling operation request comprises instructions to modify the drilling operation in the wellbore, and wherein the instructions are based at least partially upon the first proxy response, the second proxy response, the third proxy response, or a combination thereof.

7. The computing system of claim 6, wherein the downhole tool comprises the target and the offline mode proxy, and wherein the first service, the second service, and the third service are located outside of the wellbore.

8. The computing system of claim 6, wherein the operations further comprise transmitting updates to the first, second, and third services when the target is once again able to communicate with the first, second, and third services.

9. The computing system of claim 8, wherein the updates are transmitted after the second drilling operation request is generated and transmitted.

10. The computing system of claim 9, wherein transmitting the updates comprises the target, the offline mode proxy, or both transmitting to the first service the first offline request, the first offline proxy response, or both.

11. A non-transitory computer-readable medium storing instructions that, when executed by at least one processor of a computing system, cause the computing system to perform operations, the operations comprising:

monitoring a first online request from a target to a first service with an offline mode proxy, wherein the first online request comprises a first set of data and instructions to store the first set of data, and wherein the first set of data is acquired by a sensor on a downhole tool in a wellbore;

monitoring a first online response from the first service to the target with the offline mode proxy, wherein the first online response comprises confirmation that the first set of data is stored and an identifier assigned to the first set of data;

monitoring a second online request from the target to a second service with the offline mode proxy, wherein the second online request comprises instructions for the second service to transmit a second set of data to the target, and wherein the second set of data comprises previously-acquired properties from one or more offset wellbores;

monitoring a second online response from the second service to the target with the offline mode proxy, wherein the second online response comprises the second set of data;

monitoring a third online request from the target to a third service with the offline mode proxy, wherein the third online request comprises instructions for the third service to transmit a third set of data to the target, and wherein the third set of data comprises conditions for the wellbore in which the downhole tool is located;

monitoring a third online response from the third service to the target with the offline mode proxy, wherein the third online response comprises the third set of data;

monitoring a first drilling operation request from the target to the downhole tool, wherein the first drilling operation request comprises instructions to modify a drilling operation in the wellbore, and wherein the instructions are based at least partially upon the first online request, the first online response, the second online request, the second online response, the third online request, the third online response, or a combination thereof;

monitoring a first drilling operation response from the downhole tool to the target with the offline mode proxy, wherein the first drilling operation response indicates that the drilling operation has been completed;

monitoring a first offline request from the target to the first service with the offline mode proxy, wherein the first offline request comprises the first set of data and instructions to store the first set of data;

generating a first proxy response from the offline mode proxy to the target, wherein the first proxy response is based at least partially upon the first online response;

monitoring a second offline request from the target to the second service with the offline mode proxy, wherein the second offline request comprises instructions for the second service to transmit the second set of data to the target;

generating a second proxy response from the offline mode proxy to the target, wherein the second proxy response is based at least partially upon the second online response;

monitoring a third offline request from the target to the third service with the offline mode proxy, wherein the third offline request comprises instructions for the third service to transmit the third set of data to the target;

generating a third proxy response from the offline mode proxy to the target, wherein the third proxy response is based at least partially upon the third online response; and generating and transmitting a second drilling operation request from the target to the downhole tool, wherein the second drilling operation request comprises instructions to modify the drilling operation in the wellbore, and wherein the instructions are based at least partially upon the first proxy response, the second proxy response, the third proxy response, or a combination thereof.

12. The non-transitory computer-readable medium of claim 11, wherein the downhole tool comprises the target and the offline mode proxy, and wherein the first service, the second service, and the third service are located outside of the wellbore.

13. The non-transitory computer-readable medium of claim 11, wherein the operations further comprise transmitting updates to the first, second, and third services when the target is once again able to communicate with the first, second, and third services.

14. The non-transitory computer-readable medium of claim 13, wherein the updates are transmitted after the second drilling operation request is generated and transmitted.

15. The non-transitory computer-readable medium of claim 14, wherein transmitting the updates comprises the target, the offline mode proxy, or both transmitting to the first service the first offline request, the first offline proxy response, or both.

* * * * *